Figure 3:
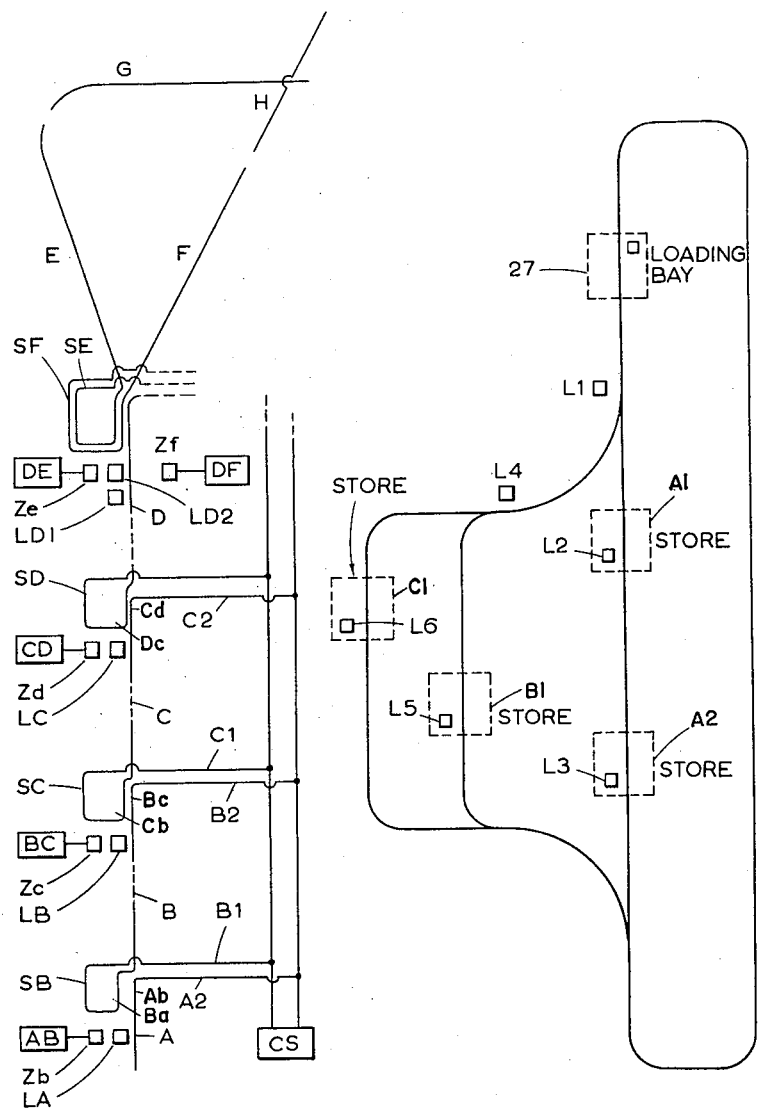

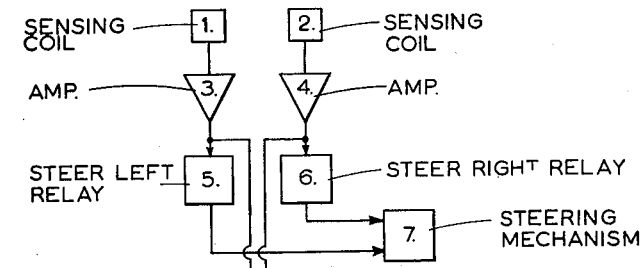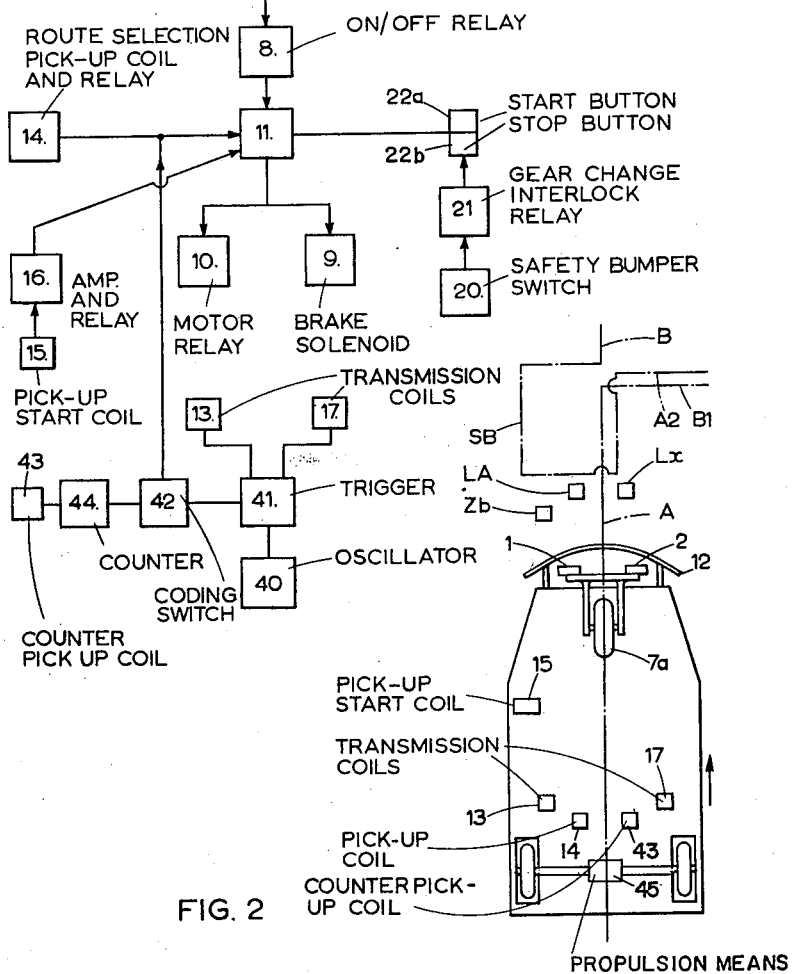
FIG. 1.
FIG. 2

June 19, 1962  W. J. C. HOSKING ETAL  3,039,554
AUTOMATIC CONTROL SYSTEMS FOR VEHICLES
Filed Nov. 23, 1959  4 Sheets-Sheet 3
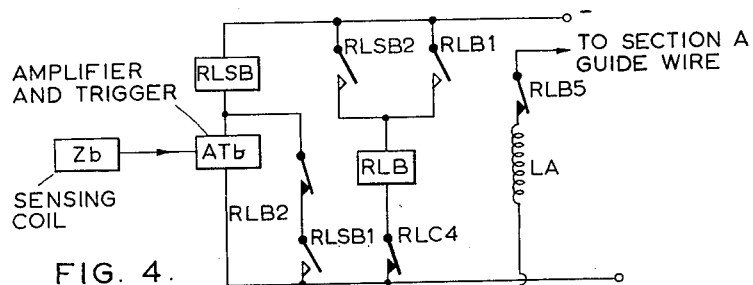
FIG. 4.
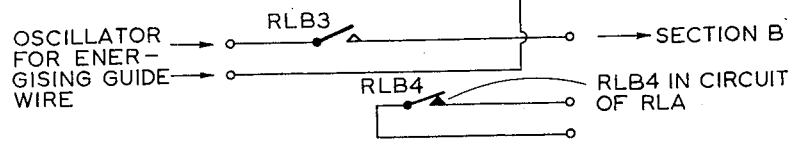
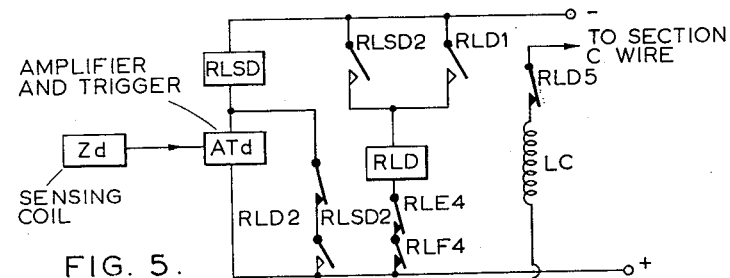
FIG. 5.
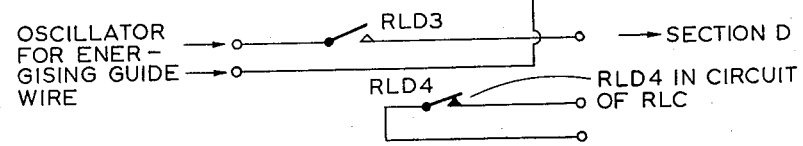
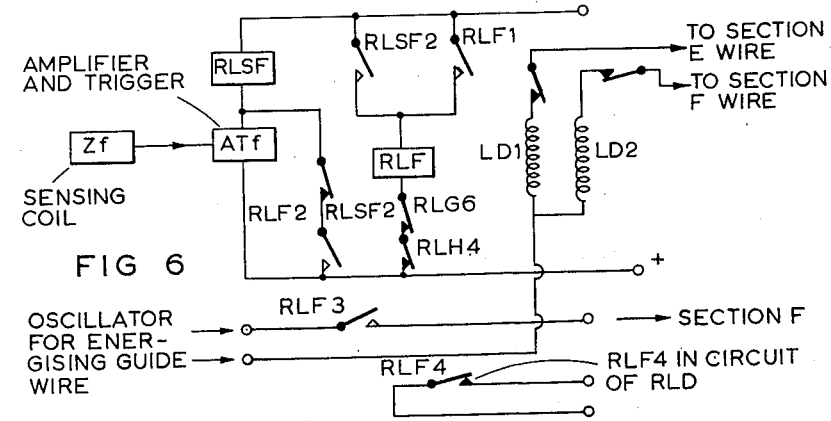
FIG 6

United States Patent Office 3,039,554
Patented June 19, 1962

3,039,554
AUTOMATIC CONTROL SYSTEMS FOR VEHICLES
William James Cecil Hosking, Eastcote, Pinner, and Arthur Ernest Barr, Wealdstone, Harrow, England, assignors to Electric & Musical Industries Limited, Hayes, Middlesex, England, a company of Great Britain
Filed Nov. 23, 1959, Ser. No. 854,779
Claims priority, application Great Britain Nov. 24, 1958
14 Claims. (Cl. 180—77)

This invention relates to conveyor systems and it relates especially though not exclusively to systems of the kind in which driverless vehicles are automatically steered along a desired route in response to an electrical signal in a conductor extending along the desired route.

A conveyor system of the kind referred to in the preceding paragraph has the advantage of versatility combined with relatively low cost. The route defining conductor may be secured on or laid just beneath the surface of the ground or floor. Normally the electrical signal for steering a vehicle is an oscillation which produces a magnetic field in the vicinity of the route defining conductor. Two sensing coils, which are attached to the vehicle proceeding along a route defined by the conductor, are so arranged that the magnetic field which exists in the vicinity of the conductor induces signals in these sensing coils. These signals are applied to control the steering mechanism of the vehicle. The arrangement is such that when one of the signals derived from the sensing coils is larger than that derived from the other, the steering mechanism operates to re-direct the vehicle in the direction defined by the route conductor. The resultant movement of the vehicle causes the positions of the sensing coils, which are fixed to the vehicle, to change in relation to the routing conductor. Thus, the steering mechanism of the vehicle is controlled in such a way as to tend to maintain equality between the voltages induced in the two sensing coils. In such a system it may often be required to employ more than one vehicle and as the vehicles may be differently loaded or may be required to follow different branches of the route, difficulty is experienced in providing a system in which a plurality of vehicles can be controlled in such a way as to allow the versatility of the system to be exploited without risk of collisions and without unduly costly equipment.

The object of the present invention is to reduce the difficulty aforesaid.

According to the present invention there is provided a vehicle control system comprising a series of sections of conductors arranged in succession along at least one route; an electrical signal source; at least one vehicle having propulsion means and control means responsive to the presence in a section of an electrical signal from said source to enable the propulsion means to propel the vehicle only along said section, and responsive to the absence of an electrical signal from said source to disable said propulsion means; a series of transfer devices, one corresponding to each transition from one section to another, each transfer device comprising a switch responsive to the presence of a vehicle at the respective transition to connect the section beginning at the respective transition to said electrical signal source and to disconnect the section ending at that transition from said source; and overriding control means responsive to the presence of a signal from said source in a section beginning at some other particular transition for delaying operation of at least one transfer device as long as the section beginning at said some other particular transition is connected to said source.

In order that the present invention may be clearly understood and readily carried into effect, the invention will now be described with reference to the accompanying drawings.

Figure 8:
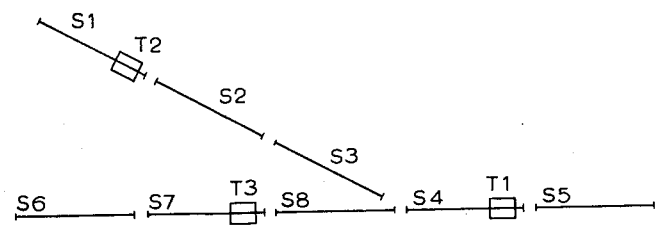
Figure 9:
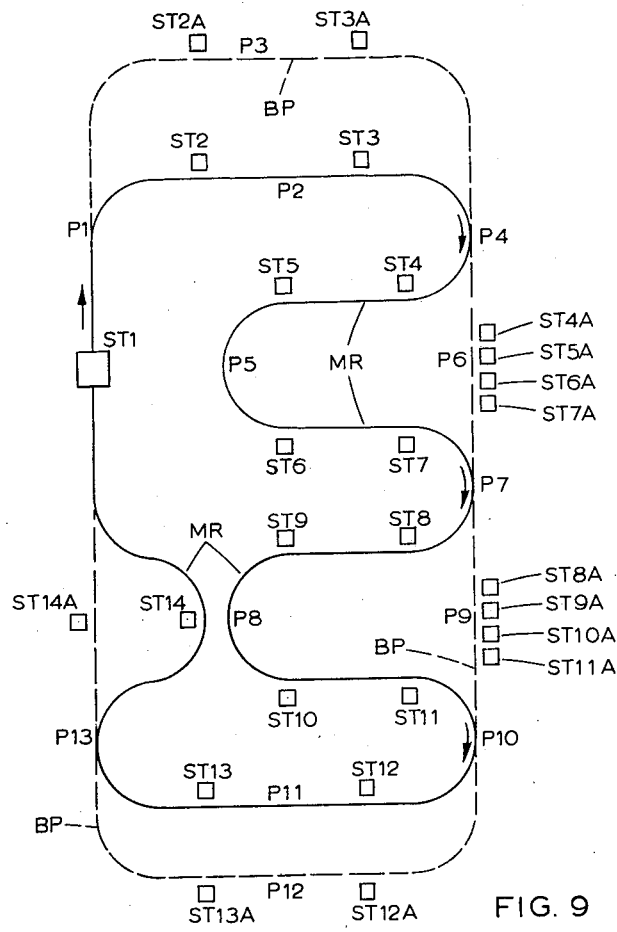

FIGURE 1 is a block diagram showing the control mechanism of one vehicle of a conveyor system according to one example of the invention, FIGURE 2 is a diagrammatic underneath plan view of one of the vehicles, fitted with the control mechanism shown in FIGURE, 1, FIGURE 3 is a diagram of part of a representative conductor layout for the conveyor system, FIGURE 4 is a diagram of a section control circuit used at the transition between the adjacent sections A and B of the layout shown in FIGURE 3, FIGURE 5 is a diagram of the control circuit at the transition between the sections C and D of the layout shown in FIGURE 3, having regard to the fact that the end of the section D is a branch point, FIGURE 6 is a diagram of the control circuit at the transition between the sections D and F, the section F being in one of two branches starting at the end of section D, FIGURE 7 is a diagrammatic view of one possible complete layout for the conveyor system, FIGURE 8 is a diagram of another part of a layout including a confluence point, and FIGURE 9 is a diagrammatic view of another possible complete layout for a conveyor system.

Conveyor systems such as illustrated in the drawings are operated by making trucks or other vehicles follow a route defined by sections of wire or other conductor which may be secured to the surface of the floor by tapes for temporary routes or laid beneath the floor for permanent routes. Alternatively the wire may be supported above ground or at the side of the routes but in the examples about to be described it will be assumed that the wire is laid just beneath the floor. The trucks are self-propelled by a battery-energized electric motor 45 and the motor is enabled to propel that truck only along a section which is energized with a predetermined electrical signal. Each vehicle has moreover steering mechanism 7 responsive to that electrical signal in such a way that the vehicle is prevented from deviating from the route defined by the conductor sections. As shown in FIGURE 3, a series of separately energizable sections of the conductor A, B, C . . . are arranged in succession along the desired route. The adjacent sections overlap to some extent as indicated in the case of the portions A*b* and B*a* of the sections A and B. Moreover leads are provided for connecting the beginnings and the ends of the respective sections to the terminals of a common source CS of an oscillatory current having a predetermined frequency. The leads to the beginning of the sections are arranged to form loops SB, SC, SD . . . with the section portions B*a*, C*b*, D*c* . . . . The leads are denoted by the references B1 and B2 in the case of the section B, and C1 and C2 in the case of section C, and so on. Control circuits AB, BC, CD . . . are provided at the transitions between adjacent sections there being two control circuits at the branch point which occurs at the end of the section D. Branch lines comprising control sections E, G . . . and F, H . . . respectively are shown diverging from the section D. The control circuits AB and BC which are more than one section away from a branch point, are different from the control circuit CD which is one section away from the branch point and are different again from the control circuits DE and DF at the branch point. The control circuits are respectively coupled to sensing coils $Zb$, $Zc$, $Zd$ . . . located beneath the floor at the side of the conductor sections A, B, C . . . . The coils $Ze$ and $Zf$ coupled to the respective control circuits at the branch point are located on opposite sides of section D.

As shown in FIGURES 1 and 2, each truck has two sensing coils 1 and 2 in which, provided the truck is over one of the sections energized from the current source CS, small voltages are induced due to the magnetic field produced by the current. The voltages in the coils are amplified by transistor amplifiers 3 and 4, which are suitably temperature-compensated, and the resultant voltages are rectified and used selectively to energize relays 5 and 6 which include bi-stable trigger circuits. These relays, called "steer left" and "steer right," control the steering mechanism 7 which comprises a steering motor connected to the front wheel 7a of the vehicle via suitable reduction gearing. As long as the truck does not deviate materially from the correct course as defined by a conductor section the voltages induced into the two sensing coils are sensibly equal and the steering control is not operated. However if the truck deviates from its intended course one or other of the coils will approach closer to the respective conductor section than the other, the voltage induced in that coil will increase, and at a predetermined value will be sufficient, via the circuits indicated, to operate the steering motor and turn the truck back on course. As soon as the truck is on course, that is with both coils 1 and 2 equally spaced on either side of the conductor, the steering motor will be switched off. A further signal is taken from the amplifiers 3 and 4 which is the sum of the individual amplifier outputs and this signal is applied to a further circuit 8 including a trigger circuit and a relay. The circuit 8 is designed so that the relay will remain operated provided the sum of the currents from the amplifiers 3 and 4 is greater than a predetermined value and when the relay is operated (and provided that a relay 11 is also operated) current is suplied to a solenoid 9 and to a relay 10. The solenoid 9 when energized releases the brakes of the truck and the relay 10 is the starter relay for the drive motor of the truck. If however the combined outputs of the amplifiers 3 and 4 is less than the aforesaid value, due for example to the absence of an energizing current in the respective section of the conductor or due to the truck having wandered off course, the relay in the circuit 8 is de-energized and interrupts the energizing circuits for the solenoid 9 and the starter relay 10, and so the drive motor is disabled. The aforesaid relay 11 is a low voltage cut out and interlock device and it is connected in series with the relay in the circuit 8. The relay 11 is arranged so that it operates only if the voltage of the battery for energizing the truck's drive motor is above a predetermined minimum, if safety bumper micro-switches 20 are closed, if a gear change interlock switch 21 is in a condition corresponding, to the gear lever being in neutral or in forward speed position, and if a "start" button 22a on the truck has been depressed. If any of the above conditions are not complied with, the truck cannot be started or if it is running the drive motor will be de-energized and the brakes will be applied. The relay 11 has a self hold contact so that if the first three of the conditions apply then on depressing the "start" button the relay becomes energized and is thereafter self holding, and provided hat current is flowing in the appropriate section of conductor, the truck will move. A "stop" button 22b is also provided on the truck, which when depressed will de-energize the interlock relay 11 and thus stop the truck. The safety bumper which operates the aforesaid micro-switch is denoted by the reference 12 in FIGURE 2 and it is such that if an obstruction is encountered the micro-switch 20 is open circuited thereby de-energizing the interlock relay 11 as aforesaid. Another safety bumper may if desired be provided at the rear of the truck, operating on the same or a different micro switch. When the truck has been halted by operation of the relay 11 it has to be manually re-started by pressing the "start" button 22a after the obstruction has been removed.

By arranging the guiding conductor in a number of sections A, B, C . . ., a number of different trucks may be used in the same layout without risk of collision, and moreover the trucks may be caused to follow different branches. Each section of the conductor is normally deenergized and the control circuits AB, BC . . . are such that only a section of track along which a truck is passing or about to pass will be energized. Each control circuit is in effect a switching device which is operable in response to the presence of a truck at the transition between the respective sections of the conductor. Operation of the switching device in response to the presence of the truck energizes the section beginning at the respective transition with current from the source CS and dis-continues energization of the section ending at that transition. However the control circuits are also such that operation of any switching device is delayed as long as a section beginning at the next or some other transition is energized from the source CS. To effect operation of the switching devices, each truck carries an oscillator 40 which supplies oscillation selectively, depending on the condition of a trigger circuit 41 to one or the other of two transmission coils 13 and 17 in the truck. The coils 13 and 17 are located on opposite sides of the longitudinal centre line of the truck so that one coil will pass over the sensing coils shown in FIGURE 3 as $Zb$, $Zc$ on one side of the route and the other will pass over any sensing coils such as $Zf$ on the other side of the route. Assume that the truck shown in FIGURE 2 has reached the end of section A and that transmission coil 13 is above the sensing coil $Zb$. A voltage is then induced in the coil $Zb$ producing a pulse which, through the intermediary of an amplifier and trigger circuit $ATb$, shown in FIGURE 4, is used to operate a sensing relay RLSB in the control circuit AB.

As shown in FIGURE 4, the relay RLSB has a self hold switch RLSB1. In order that the truck may proceed into section B, section C must be de-energized and therefore no truck must be over that section. If this condition exists, switch RLC4 is closed allowing the relay RLB to be energized through the switch RLSB2 operated by the relay RLSB. The relay RLB has a self holding switch RLB1. When RLB is energized, RLSB becomes de-energized due to the opening of the switch RLB2. Moreover the switch RLB3 is closed allowing current to be supplied from the source CS to section B. The switch RLB4 is opened to de-energize section A and to prevent re-energization of that section as long as section B, and therefore relay RLB, are energized. It will be understood that the switch RLB4 occupies the same position in the control circuit at the beginning of section A as does the switch RLC4 in the control circuit at the beginning of section B. In the circuit shown in FIGURE 4 (and also in FIGURES 5 and 6) relay switches which are closed in the de-energized states of the respective relays are illustrated with blackened contacts. Therefore it can be seen that if the section C is unoccupied, so that the switch RLC4 is closed, then the truck arriving at the transitions between sections A and B can cause operation of the switch RLB3 to energize section B so that the truck may proceed. If however there is a truck over section C, and that section is therefore energized from source CS, the switch RLC4 is open and therefore the relay RLB cannot be energized. In this case however, the relay RLSB will remain energized, being self maintaining as long as relay RLB is de-energized. Thus it stores information that a truck is waiting to pass into section B. As long as RLB is not energized, a coil LA, shown in FIGURE 3, connected in series with section A via the relay RLB5 remains energized. There are similar coils LA, LB, LC at successive transitions, there being two such coils LD1 and LD2 at the branch point. The coil LA is set in the floor so that as the truck approaches the transition from section A to section B a pick-up coil 14, shown in FIGURE 2, on the truck passes over the coil LA and the voltage induced in the coil 14 operates the relay 11 and stops the truck. Therefore if section C is occupied, and the switch RLC4 is open, operation of the switch RLB3 is delayed until section C is clear.

By positioning the coil LA it is arranged that if the truck is stopped by the action of that coil, then it will stop over the loop SB, shown in FIGURE 3, at the beginning of section B. Since as aforesaid the relay RLSB is energized, as soon as section C becomes clear the switch RLC4 is closed allowing the relay RLB to be energized to close switch RLB3 and energize section B. As can be seen from FIGURES 2 and 3, the loop SB is arranged in such a way that the side of this loop Ba, parallel to the conductor portion B, lies under a start coil 15, while the truck is waiting to proceed into section B. When section B becomes energized, this coil has a voltage induced into it which voltage, amplified in an amplifier 16, shown in FIGURE 1, causes the interlock relay 11 to be re-energized and resets the truck in motion. When the truck is automatically stopped at the end of any particular section, the energization of that section continues and is overlapped (by reason of overlapping section portions) by the energization of the section ahead when eventually that section is energized. Thus when the signal is given for the truck to proceed by reason of the section B becoming energized, and section A is de-energized, at no time do the sensing coils 1 and 2 for the steering motor lose their input, and therefore steering control is never lost.

The control circuits CD and DF shown in FIGURES 5 and 6, respectively, are generally similar to the control circuit AB, and the differences are believed to be self-explanatory. Corresponding components in FIGURES 4, 5 and 6 are denoted by similar reference characters, except that the last letter in each of the reference characters in the figures serves to relate the respective component to the appropriate control circuit.

Referring again to FIGURE 3, suppose it is desired to send the truck along section F and that it is approaching the end of section C. As can be seen from FIGURE 5 providing RLE4 and RLF4 are closed i.e. no truck is in section E or section F, then RLD can be energized and the truck is able to proceed along section D. As aforesaid the two transmission coils 13 and 17 can be connected selectively to the truck oscillator. The selection can be determined by a coding switch 42, shown in FIGURE 1, which will be referred to subsequently. If the oscillator is connected to the transmission coil which passes over Zf, FIGURE 3, then a pulse will be produced which will operate RLSF shown in FIGURE 6. RLF will then be energized, providing RLH4 and RLG6 are closed, that is block H and block G tracks are not energized, and the truck will proceed along block F.

It can be seen that if other sections join or cross a particular section further inhibiting contacts can be provided in the appropriate section energizing relays. As these other sections all become clear the relay will energize the particular section via the sensing relay contacts.

Reference will now be made to FIGURE 8 to explain how control is exercised over trucks approaching a point of confluence. The references S1 to S8 indicate sections of the conductor, such as are described with reference to FIGURE 3. The sections S1, S2 and S3 form the end of one branch, and the sections S6, S7 and S8 form the end of a second branch along both of which branches trucks may travel towards the common branch the start of which is indicated by sections S4 and S5. As described above the energization of a section is inhibited if the following section is energized, so as to maintain at least one empty section between trucks. However, in addition an arrangement of inhibitions which maintains the desired empty section between vehicles is given in the following table:

| Section No. | Inhibited by Section No. |
| --- | --- |
| S1 | S2 |
| S2 | S3 |
| S3 | S4, S8 |
| S4 | S5 |
| S6 | S7 |
| S7 | S8 |
| S8 | S3, S4 |

Of course, the inhibitions for the rest of the system will be as described above. The double inhibitions can be achieved by similar means to that described with reference to FIGURE 5.

Assume that a truck T1 has stopped in section S4, then a truck T2 approaching along the upper route will be stopped in section S2, and a truck T3 approaching along the lower route will be stopped in section S7. When T1 leaves S4, T2 will move to S2 and T3 to S8 and on to S4 following T1. The truck T2 will move to S3 when T3 leaves S8 and S4. Thus it can be seen that any dispersion of trucks arriving along the two confluent branches can be fed into the common branch, being taken alternately, firstly from one confluent branch and then from the other.

To start a truck on the system all that is required is to drive manually over the beginning of a given section with the oscillator on the truck functioning (a push button being provided for this purpose) so that the partciular block will energize as outlined previously. The truck may then be set to "automatic" and will proceed in the normal fashion.

If a truck breaks down while travelling along a section, that section would remain energized in the absence of a clearing signal, since the truck has failed to pass into the next section. Therefore other trucks cannot approach closer than one unoccupied section away. If a "stop" coil fails then the system will still operate safely as instead of stopping within one of the loops SB, SC . . . it will proceed to only the end of the section since the next section is unenergized. The preceding section then remains "dead." If a truck fails to induce a pulse into a magnetic pick-up coil due to a failure of the oscillator for instance, then the truck will fail to energize the sensing relay, for example RLSB, and therefore the next section will remain dead. The appropriate stop coil LA, LB . . . will then bring the truck to a halt. The section in which it then stands is still energized and further trucks cannot approach more than one section block away. Therefore it can be seen that a number of trucks can now safely be run over a complex layout. The criterion for the number of sections employed will be the number of branches and intersections envisaged and the amount of traffic passing down a particular route. The maximum number of trucks which can be run on a particular system is half the number of blocks minus one.

To ensure that a given truck reaches its correct destination, an arrangement such as shown in FIGURE 7 may be adopted. In this arrangement, at certain points on the track, such as where the track diverges, further coils L1, L2, etc. are located. These are fixed in the floor and are permanently energized, one such coil Lx being represented in FIGURE 2. A further pick-up coil 17 and relay or counter pick-up coil 43 on the truck, shown in FIGURES 1 and 2 operates a counting mechanism 44 as each coil L1, L2 etc. is passed. The counting mechanism is associated with the aforesaid coding switch 42, so that if an operator has set up a given code on the switch 42 then at appropriate points en route the oscillator will be switched alternately to the right and left hand transmission coils 13 and 17. For example the coding switch may be arranged to send a pulse to the trigger circuit 41 whenever the counter records a count which has been preset on the coding switch. The trigger circuit will then change its state and switch the oscillator 40 from one core 13 or 17 to the other. The coding switch may be of known construction. Thus the truck can be made to pursue the desired course. The counting mechanism may also be arranged to determine via the coding switch where the truck will stop, energizing when the appropriate count is reached, a relay, which in conjunction with the interlock relay 11 stops the truck. Assume for example that it is desired to send a truck from the loading bay 27 of FIGURE 7 to a store, such stores being denoted by the references $A_1$, $A_2$, $B_1$, $C_1$ . . . . The code for the selected store may be $B_1$, and this is set on the truck, by operating a number of multiposition rotary switches and pushing a button so that the information is stored in the coding switch unit. On reaching L1 the appropriate one of the transmission coils 13 and 17 on the truck is energized so that the truck turns right at the first turn, and at L4 the transmission coils are switched so that the left-hand turn is taken. On reaching L5 the relay 11 is energized via the relay 14. Having reached the desired destination the counting mechanism returns to zero automatically and the truck can either be re-coded or returned to its point of storage or circulation. Should any or all of the counting coils fail then the system will still operate safely, the only thing which can occur is that a truck may reach the wrong destination.

In a busy congested area where other manually controlled traffic is present, the demand may arise for the control of traffic lights, illuminated warning notices, hooters, and such like. Thus from FIGURES 2 and 3 it has been seen that the approach of a truck can be determined by the energization of various section relays, and therefore it is a simple matter to control other traffic which may be required to cross a truck's course by operating traffic lights. Further, a truck may be inhibited by other traffic if it is desired to give this precedence over a truck. In a similar fashion conveyor systems, barriers, solenoid-operated doors and so on can be controlled, or have control of trucks.

Furthermore the control systems may be modified in many ways. For example, provision may be made for running trucks in reverse if need be, for control at points where two tracks converge, and for bi-directional running in one or more sections.

If it is found desirable for the trucks to be reversible, additional sensing coils may be provided at the rear of the trucks with means for coupling these to the steering mechanism instead of the normal sensing coils 1, 2 used for forward motion.

In the layouts so far described no provision is made for one truck overtaking another on the same circuit. In systems with much traffic, this may have the disadvantage that whilst a truck is being loaded or unloaded at some point on the route, vehicles following are held up until the loading or unloading is completed. To overcome this disadvantage the arrangement shown in FIGURE 9 may be adopted.

According to FIGURE 9 the main route is indicated by the unbroken line MR which guides trucks from the originating station ST1 via the stations ST2, ST3, ST4 . . . ST14 back to the originating station again. At each of the stations ST1, ST2 . . . an energized stop coil like LA for example is placed in the floor which induces a voltage in a coil mounted on the trucks. No circuits for the coils at the stations ST1, ST2 . . . are shown because such circuits will be obvious. By-pass routes for sections of the main route MR are indicated by the broken line BP and carry repeater coils ST2A, ST3A . . . ST14A. The trucks for use on a layout such as indicated in FIGURE 9 may have control mechanism generally similar to that described with reference to FIGURES 1 and 2. Each truck carries a counting mechanism, which may be the mechanism associated with the coil 14 or additional mechanism, and this mechanism records the progress of the truck along a route by counting the coils ST2, ST3 . . . which are passed. However instead of the coding switch 42 above referred to, each truck may have a route selection unit comprising a small "patch board" into which plugs may be inserted indicating the stations at which the vehicle is to stop. For example, if a truck is required to stop at stations ST4 and ST12 only the appropriate plugs are inserted and the truck started in the manner described at the originating station ST1. At the point P1 on the route, the patch board programme, since it indicates that the truck is not required to stop at ST2 or ST3, causes that one of transmission coils 13 and 17 to be energized which causes the truck to follow the route P1, P3, P4, section by section as explained, and the truck follows this route to the point P4. As the truck passes the repeater coils ST2A and ST3A its programme counter is stepped on thus recording the progress of the truck.

When the programme counter records that two coils have been passed, a requirement to stop at station ST4 is detected on the patch board. Therefore the oscillator on the truck is connected to the transmission coil which causes route P4, P5, P7 to be taken at point P4. The stop coil at station ST4 causes the truck to halt there. When the loading or unloading at station ST4 is finished, the truck is restarted and continues past stations ST5, ST6 and ST7 to the point P7. Before the point P7 the oscillator on the truck will have been switched so that route P7, P8, P10 is taken because a stop at station ST10 is programmed. The truck passes stations ST8 and ST9 and stops at station ST10. When the transfer of goods is completed the truck is restarted and returns to the originating ST1 via the route indicated by the broken line, i.e. P12 and P13.

It will be appreciated that the progress of the trucks may be affected by the presence of other trucks on the layout but the spacing between adjacent trucks is always at least one section of conductor. Confluent points are controlled as explained with reference to FIGURE 8.

A mimic diagram of the system may readily be added by arranging lamps behind a map so that the energizing voltage for a section of conductor causes the illumination of the corresponding section of the map. In this way, breakdowns may be easily detected by an operator at a central point.

Many modifications of detail may of course be made in the system described. For example, lamps and photoelectric cells may be used in some cases instead of transmission and pick-up coils.

What we claim is:

1. A vehicle control system comprising a series of sections of conductor arranged in succession along at least one route; an electrical signal source; at least one vehicle having propulsion means and control means responsive to the presence in a section of an electrical signal from said source to enable the propulsion means to propel the vehicle only along said section, and responsive to the absence of an electrical signal from said source to disable said propulsion means; a series of transfer devices, one corresponding to each transition from one section to another, each transfer device comprising a switch responsive to the presence of a vehicle at the respective transition to connect the section beginning at the respective transition to said electrical signal source and to disconnect the section ending at that transition from said source; and overriding control means operatively associated with at least one transfer device and responsive to the presence of a signal from said source in a section beginning at some other particular transition, in which section the presence of another vehicle might give rise to a collision, for delaying operation of the at least one transfer device as long as the said last mentioned section is connected to said source for delaying operation of the at least one transfer device as long as the section beginning at said some other particular transition is connected to said source.

2. A system according to claim 1 wherein said vehicle has steering mechanism responsive to the presence of said electrical signal in that conductor section along which the vehicle is propelled, to steer the vehicle along a course defined by said conductor section.

3. A system according to claim 1 wherein said overriding control means is arranged to delay operation of at least one transfer device as long as the section beginning at the next transition is energized with the electrical signal from said source.

4. A system according to claim 1 in which three sections of said conductor have a common transition point, the transfer device at the other transition point of one at least of said sections including means for delaying operation of that switching device as long as either of the remaining two of said three sections is energized.

5. A system according to claim 1 in which successive conductor sections overlap and means are provided for stopping a vehicle above overlapping portions of conductor sections when the section beginning at said other transition is energized.

6. A system according to claim 1 wherein said transfer devices are arranged to control energization of sections in intersecting portions of the route defined by said conductor sections.

7. A system according to claim 1 wherein each transfer device comprises a sensing element and relay means responsive to a signal produced by said element in response to the presence of a vehicle.

8. A system according to claim 7 wherein said sensing elements are inductors.

9. A system according to claim 7 comprising a transmission element on said vehicle and an energy source for energizing said transmission element, said transmission element being arranged to cause the sensing elements of said transfer devices to produce an output signal when the vehicle passes said sensing elements.

10. A system according to claim 9 wherein said transmission elements are inductors.

11. A system according to claim 9 comprising a second transmission element in said vehicle, said first and second transmission elements being positioned on opposite sides of the longitudinal centre line of said vehicle, and selector means for causing said energy source to energize one or the other of said transmission elements, and comprising sensing elements disposed on both sides of said conductor sections to cooperate respectively with said first and second transmission elements, whereby different transfer devices corresponding to said sensing elements can be operated selectively in response to operation of said selector means.

12. A system according to claim 11 wherein said different transfer devices are arranged to energize different conductor sections in separate branches of a route defined by said conductor sections.

13. A system according to claim 11 comprising transmission elements located at different points along a route defined by said conductor sections, counting means on the vehicle sensitive to said latter transmission elements to record the passing thereof and means for operating said selector means in response to the attainment of predetermined states by said counting means.

14. A system according to claim 13 comprising means for stopping the vehicle in the attainment of a predetermined state by said counting means.

References Cited in the file of this patent

UNITED STATES PATENTS

| | | |
|---|---|---|
| 2,317,400 | Paulus et al. | Apr. 27, 1943 |
| 2,339,291 | Paulus et al. | Jan. 18, 1944 |
| 2,690,626 | Gay et al. | Oct. 5, 1954 |
| 2,803,743 | Ballerait | Aug. 20, 1957 |
| 2,847,080 | Zworykin et al. | Aug. 12, 1958 |